United States Patent
Noda

(10) Patent No.: US 11,250,222 B2
(45) Date of Patent: Feb. 15, 2022

(54) MULTILINGUAL EXCHANGE SYSTEM AND MESSAGE TRANSMISSION METHOD

(71) Applicants: LANGUAGE DISCOVERY LTD, Kew (AU); Fumitaka Noda, Tokyo (JP)

(72) Inventor: Fumitaka Noda, Tokyo (JP)

(73) Assignees: LANGUAGE DISCOVERY LTD, Victoria (AU); Fumitaka NODA, Tokyo (JP)

( * ) Notice: Subject to any disclaimer, the term of this patent is extended or adjusted under 35 U.S.C. 154(b) by 231 days.

(21) Appl. No.: 16/482,754

(22) PCT Filed: Feb. 2, 2018

(86) PCT No.: PCT/JP2018/003670
§ 371 (c)(1),
(2) Date: Oct. 15, 2019

(87) PCT Pub. No.: WO2018/143435
PCT Pub. Date: Aug. 9, 2018

(65) Prior Publication Data
US 2020/0134027 A1     Apr. 30, 2020

(30) Foreign Application Priority Data

Feb. 2, 2017 (JP) .............................. JP2017-017212

(51) Int. Cl.
| | | |
|---|---|---|
| *G06F 40/58* | (2020.01) | |
| *G06F 40/211* | (2020.01) | |
| *G06F 40/55* | (2020.01) | |
| *G09B 19/06* | (2006.01) | |
| *G06F 40/47* | (2020.01) | |
| *G06F 40/51* | (2020.01) | |

(52) U.S. Cl.
CPC ............ *G06F 40/58* (2020.01); *G06F 40/211* (2020.01); *G06F 40/47* (2020.01); *G06F 40/51* (2020.01); *G06F 40/55* (2020.01); *G09B 19/06* (2013.01)

(58) Field of Classification Search
CPC .......... G06F 40/51; G06F 40/47; G06F 40/40; G06F 40/58
See application file for complete search history.

(56) References Cited

U.S. PATENT DOCUMENTS

| | | | | |
|---|---|---|---|---|
| 5,373,441 A | * | 12/1994 | Hirai .................... | G06F 15/0283 704/2 |
| 2003/0040899 A1 | * | 2/2003 | Ogilvie .................... | G06F 40/58 704/2 |
| 2005/0216251 A1 | * | 9/2005 | Dorius .................... | G06F 40/40 704/2 |
| 2008/0288241 A1 | * | 11/2008 | Noda ...................... | G09B 19/06 704/4 |
| 2015/0161115 A1 | * | 6/2015 | Cuthbert ............... | G06F 40/242 704/2 |
| 2020/0134027 A1 | * | 4/2020 | Noda ...................... | G06F 40/55 |

FOREIGN PATENT DOCUMENTS

| | | |
|---|---|---|
| JP | 2000-090086 A | 3/2000 |
| JP | 2001-183971 A | 7/2001 |
| JP | 5124469 B2 | 1/2013 |
| WO | 2007/053911 A1 | 5/2007 |

OTHER PUBLICATIONS

Aug. 6, 2019 International Preliminary Report on Patentability issued in International Patent Application No. PCT/JP2018/003670.
Apr. 3, 2018 International Search Report issued in International Patent Application No. PCT/JP2018/003670.

\* cited by examiner

*Primary Examiner* — Samuel G Neway
(74) *Attorney, Agent, or Firm* — Oliff PLC

(57) ABSTRACT

A multilingual exchange system and message transmission method that enables exchange of messages in a foreign language in a simple manner without any special translation skill, and, simultaneously, allowing for dramatic improvement in grammatical accuracy when converting messages into a second language. In an outer box 106, which is a display area for a modifier in a third sentence pattern sentence inner boxes 106A, 106B, and 106C are allocated to each part of speech in English, which is the second language, and inner boxes 106A, 106B, and 106C can be recognized as separate inner boxes. Even if display content in a first language is divided into three inner boxes, there is no need to divide display content in second language into three inner boxes, and even if substitutions of parts of speech or changes in content occur in one language, it is possible to maintain grammatical accuracy in another language.

10 Claims, 9 Drawing Sheets

Message Received

| Date | 2005/9/26 10:00:00 |
|---|---|
| From | Toshitaka |
| Age | 9 |
| Birthday | 8 July |
| Title | Sport in Japan |
| Message | My favorite sports is sumo |

[ Reply ]

Explanation of words and culture

Audio/Visual/Text explanation
Sumo: A national sport in Japan
..................................................
[ Pictures ]  [ Videos ]   [ Sound 🔊 ]

| 日付 | 2005/9/26 10:00:00 |
|---|---|
| 差出人 | Steve |
| 年齢 | 9 |
| 誕生日 | 9月20日 |
| タイトル | フットボール |
| メッセージ | 好きなスポーツはフットボールです。 |

[ へんじする ]

言葉と文化の説明

音声、写真、動画による背景説明
フットボール(footy): オーストラリアでは、フッティという..
..................................................
[ 写真 ]  [ ビデオ ]   [ 音声 🔊 ]

MULTILINGUAL EXCHANGE SYSTEM AND MESSAGE TRANSMISSION METHOD

TECHNICAL FIELD

This invention relates, in general, to a multilingual exchange system and a message transmission method for messaging a sentence that is divided into sections and entered in a first language to be converted into a second language that is divided and translated and relates more particularly, though not exclusively, to an Internet based multilingual exchange system and message transmission method.

TECHNICAL BACKGROUND

Around the world, globalization has been the theme from the past century and is even more important in the 21st century. Being able to effectively communicate with people in different countries and cultures is desirable.

To respond to this globalization trend, for example in Japan, there have been numerous English schools and English learning materials available in the market for a long time and currently language education such as for English are just about to be introduced into primary school curriculums. This trend of lowering of age groups of learners is common among many other countries.

However, an important element for language education in Japan and in many countries is for the students to understand the value of learning foreign languages. Giving purpose to learn another language to students is the key solution to make language education successful which are agreed upon by many people, but unless opportunities to use the acquired language in a meaningful and purposeful way are provided effectively, it is not possible to sustain the interest of students and raise their motivation to study.

For example, in Japan, many interactive CD ROMs and software provide an element of entertainment, but because the response is not natural and is not the same as real human interaction, it fails to maintain continued interest among young learners of English. Children like children as partners but in Japan it is difficult to find English-speaking children as partners.

When people living in different countries with different languages want to exchange messages and become friends, they had to construct sentences in a second language and type them from keyboards. This restricted users who lacked those skills to create overseas friends and exchange regularly.

And with conventional translation software, it can translate certain words, but lacks accuracy, which become an obstacle to email exchange.

Also, for language education, it is effective to understand the structural differences between languages, however construction of messages with a translation device does not let the students have direct experience of constructing messages in other languages.

Therefore, the present inventor has created a multilingual exchange system, which allows people with different languages to mutually understand each other, and have already disclosed it (Patent Document 1 below).

This multilingual exchange system includes a communication device, which comprises an input screen on which a message in a first language is displayed in a second language, the input screen has a message construction window which arranges each display elements to a designated division which can display at least one sentence or phrase in the first language, a group of the display elements of the message construction window displays multiple words that are included in at least one sentence or phrase of the 1st language, in the group of display elements of the message construction window displays multiple words in the 2nd language that are corresponding to the multiple words of the 1st language, which also has a sequence based on the order which the at least one sentence of phrases in the 1st language would appear in the display of the second language, wherein a user would follow the sequence to enter or select the each display elements so that at least one sentence or phrase of the 1st language would be displayed in a correct word order of the 2nd language.

Based on this multilingual exchange system, people will be able to easily and to a certain extent accurately exchange messages in foreign languages with out having special translation skills, and through the process can understand the structural differences between the languages which can also contribute to language education.

PRIOR ARTS LIST

Patent Document

Patent Document 1: Japanese Laid-Open Patent Publication No. 5124469(B)

SUMMARY OF THE INVENTION

Problems to be Solved by the Invention

However, there is a desire to further develop the multilingual exchange system and make a leap in the accuracy of the 2nd language messages. Of course, this is not to sacrifice the capability but to secure the same level of capability to process and convert the 1st language to a 2nd language and transmission it to a communication partner easily without requiring a special translation skill as the above mentioned conventional technology.

This invention is in consideration of the above situation, and the objective is to allow provision of a multilingual exchange system and a message transmission method that can allow people to easily exchange messages in foreign languages even without having special translation skills and when doing so can rapidly improve the grammatical accuracy of the messages being converted into 2nd languages.

Means to Solve the Problems

Basically, English allows any sentences to be expressed within one of the 5 sentence patterns. The present inventor has focused on this special characteristics of English, and have arranged to accurately replace the 1st language, no matter what kind of sentence it is, with the 2nd language by adapting the 1st language sentence to one of the 5 sentence patterns of the English language and also converting each element of the 5 sentence patterns into 2nd language sentences. Therefore, the invention sets English as the key language and based on the 5 sentence patterns of the English language it enables the 1st language to be replaceable with the 2nd language. In addition, English can either be the 1st language or the 2nd language or a middle language that intermediates the 1st and the 2nd language replacements.

The 5 sentence patterns of English is comprised combinations of each element of S, V, O, C, among which subject S and predicated verb V are essential elements (subject S can be abbreviated for certain phrases but should essentially exist) and objective O, complement C, modifier M are added and combined as appropriate.

Also under the present invention, the multilingual exchange system, the sentence construction screen which is the area where it displays the actual elements of the 5 sentence patterns (generally a rectangular box area) shall be called the Outer Palette (For the preferred embodiment it will be called the Outer Box), and the display field where the Outer Palette elements are further broken down into each corresponding parts of speech shall be called the Inner Palette (Inner Box), and these double layered structures created by the Outer Palettes (Outer Boxes) and the Inner Palettes (Inner Boxes) shall be called Double Palettes.

In order to achieve the above objective, the invention's multilingual exchange system includes a message communication device that is comprised of a message construction window that can display messages that includes at least one sentence or phrase, and the message construction window displays a 2nd language message that corresponds with the 1st language message and can send at least the message in the 2nd language.

The message construction window can show a display element column arranging display elements which are display fields for respective elements corresponding to each of five English sentence patterns, and is configured that necessary elements of the elements of five English sentence patterns which are subject S, predicate verb V, objective O, complement C, and modifier M are made to correspond to each of the display elements of the respective display element columns and on each of the corresponding display elements, one or multiple words related to the message that are included in the at least one sentence or phrase of the 1st language are displayed, and also one or multiple words in the 2nd language that are corresponding to the one or multiple words of the 1st language are displayed; and an order of the display elements is changed so that a text including the displayed at least one sentence or phrase of the 2nd language can be arranged into a correct word order.

This multilingual exchange system is preferred to be comprised of multiple sub display elements that can be allocated to each of the display elements depending on the sentences and phrases to be displayed on each of the display elements, and on each of the sub display elements, the sentences and phrases shown on the display elements can be divided and entered based on their parts of speech.

Here, the display elements corresponding to the subject S, the predicate verb V, the objective O, and the complement C are prohibited to delete or add, but the display elements corresponding to the modifier M are allowed to delete or add.

On the other hand, the sub display elements are allowed to convert, delete or add.

Also, in order to achieve the above objectives, the invention's method for transmitting a message will be comprised of a message construction window on which a message including at least one sentence or phrase in a 1st language can be displayed, the message construction window displays a 2nd language message that corresponds with the 1st language message, and at least the 2nd language message is sent, wherein, the message transmission method includes: being capable of displaying a display element column on which the display elements are allocated for each of five English sentence patterns on the message construction window, corresponding necessary elements of the elements of five English sentence patterns which are subject S, predicate verb V, objective O, complement C, and modifier M to each of the display elements of the respective display element columns; displaying on each of the corresponding display elements, one or multiple words related to the message included in the at least one sentence or phrase of the 1st language and also one or multiple words in the 2nd language corresponding to the one or multiple words of the 1st language; changing an order of a text including the displayed at least one sentence or phrase of the 2nd language into a correct word order.

It is preferred that this method for transmitting a message, wherein multiple sub display elements can be allocated to each of the display elements, and on each of the sub display elements, the sentences and phrases to be displayed on the display elements are divided and entered based on their parts of speech, and at the least, the message created in the 2nd language is sent to a counterpart including a user of the 2nd language, in accordance with a predetermined operation.

Under this method for transmitting a message, it is also possible to transmit the message by text data and also by voice data of the user who orally speaks based on the reproduction of the message by voice.

Advantageous Effects of the Invention

The invention's multilingual exchange system and the message transmission system, wherein the 1st language is converted into the 2nd language, English will be the key language, and it uses English's basic 5 sentence patterns comprising of S, V, O, and C which are among the subject S, the predicate verb V, the objective O, the complement C, and the modifier M. English has a special character that it can categorise and convert any language that is chosen for the 1st language to send to a counterpart into one of English's sentences patterns. Also English has a special character that when any of the languages are chosen to be the 2nd language, it can accurately convert any English sentence patterns into a sentence of the 2nd language.

Therefore, when a language is converted from the 1st language to the 2nd language, first, a sentence of the message in the 1st language will be categorised into one of the 5 English sentence patterns, and also the display elements of each of the categorised sentence will be converted from the 1st language to English. After which, each of the display elements of the converted English sentence pattern shall be replaced from English to the 2nd language. With this, the above-mentioned special character of the English language can be used; therefore the message sentence of the 1st language can be replaced with the 2nd language easily and accurately.

In this way, any sentence patterns of English can be categorised into one of the 5 sentences patterns, and by using one of the 5 sentence patterns as a base for replacing languages, tolerance can be restricted on the part of grammar for the basic and fundamental part of the language, thereby allowing languages to be replaced with accurate grammar. This can enhance study effects of other languages and smoothen communication between different languages.

On the multilingual exchange system of the invention, the above described display elements of each sentence patterns ("Outer Palette" hereafter) are allocated to designated divisions, and within each of the display element, multiple sub display elements ("Inner Palette" hereafter) can be allocated, and in each of this Inner Palette, words that are comprised of parts of speech which corresponds to each element of the 5 sentence patterns can be entered, and each word entered into the Inner Palette can be changed, and thereby can enhance the flexibility and accuracy of the sentence details during language conversions.

And when customising a sentence by replacing an allocated and inserted word (parts of speech) in each Inner Palette, English grammar accuracy can be maintained if other parts of speech are automatically corrected based on the English grammar rule.

Because the Outer Palettes are configured to link each language in terms of meanings, a unique palette cannot be setup, however for the Inner Palette, original subdivisions are possible for each language. This enables maintaining grammatical accuracy even if parts of speech are replaced or contents changed.

BRIEF DESCRIPTION OF THE DRAWINGS

FIG. 7 is a chart to describe when the display contents of a box (palette) is changed, how the display contents of the other box (palette) will change (Chart showing "before the change");

FIG. 8 is a chart to describe when the display contents of a box (palette) is changed, how the display contents of the other box (palette) will change (Chart showing "after the change");

FIG. 9 is a view of a computer message receiving screen of the multilingual exchange system of FIG. 1 for a Japanese speaking user.

FIG. 10 is a view of a computer message receiving screen of the multilingual exchange system of FIG. 1 for an English speaking user.

DESCRIPTION OF THE EMBODIMENTS

Figure 1:
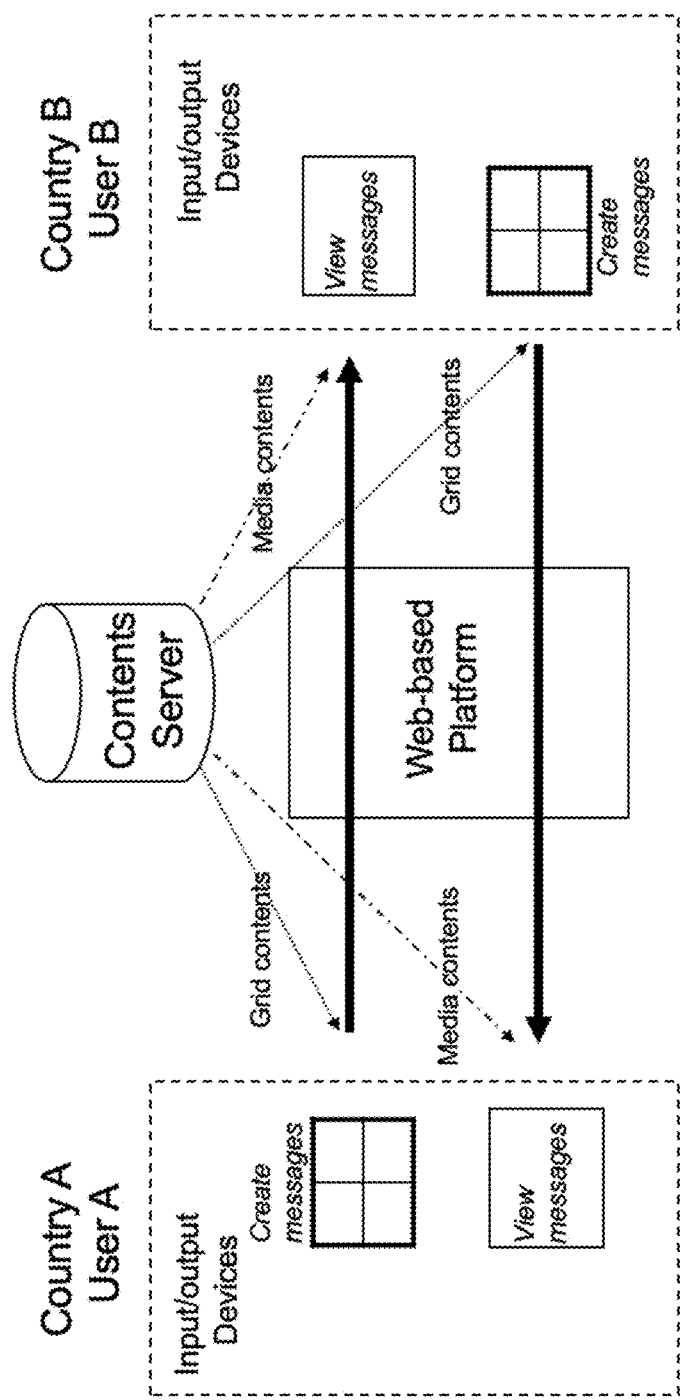
FIG. 1 is a schematic view of a preferred embodiment of a multilingual exchange system and a message transmission method in accordance with the present invention.

Below, a preferred embodiment of the invention of the multilingual exchange system and the message transmission method are described with reference to the drawings.

The main feature of the preferred embodiment of the invention resides in its message construction window, but first an outline of the multilingual exchange system 10 as its base will be described.

In the drawings there is a multiple language exchange system 10 which uses the Internet for communication. The preferred embodiment will be discussed with reference to English and Japanese speaking users, but is not limited to this combination. The system could be used for Japanese and Chinese users (refer to FIG. 7) or other combination of any language.

In this embodiment user A is based in Japan and has a computer 12 and user B is based in Australia with a computer 14. The users communicate through menus on their computers 12, 14. The Japanese user has a message creation menu 16 and a message viewer menu 18 whilst the Australian user has a message creation menu 22 and a message viewer menu 20. The appearance of menus 16-22 can vary to suit particular requirements and design criteria and are not limited to those described. Computers 12, 14 communicate via the Internet on a web based platform 24. The web based platform 24 provides communication with a contents server 26 which contains dictionaries for the various languages, software for controlling operation of the multilingual exchange system, audio and visual media files and other relevant material and computer files for operation of the system. Of course, communication method is not limited to the Internet but can use various forms of communication measures including dedicated lines.

Figure 2:
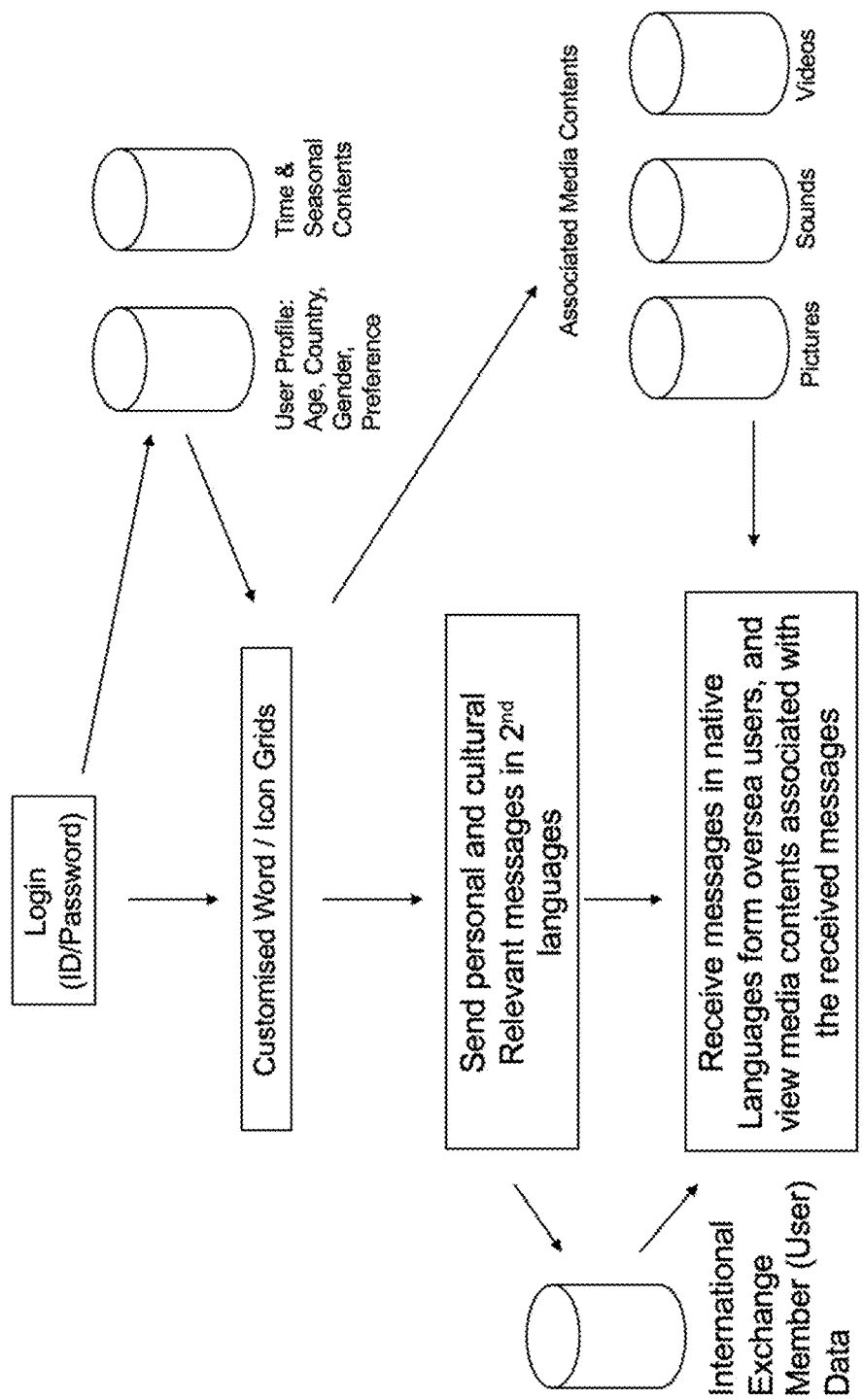
FIG. 2 is a flow chart of operation of the multilingual exchange system shown in FIG. 1.

FIG. 2 shows a flow chart illustrating operation of multilingual exchange system 10. Contents server 26 has been separated into various subsections, which maintain components of the system. A user database 28 holds information on details of each user. Such information would include name, address, age, gender, interests and other information, which is useful in providing interesting facts to other users. Database 30 contains information on time, seasons, history and other information. A selection of audio and visual files are also classified and stored on contents server 26 and may include, but are not limited to, pictures 32 e.g. JPEG files, audio files 34 e.g. WAV files and video files 36 e.g. AVI files. An exchange database 38 allows the user to communicate with another user in another language.

The operation of the system 10 will be explained in greater detail later in this specification with reference to the menus. The user, for example, based in Japan, will log into the system 10 through a web connection at step 40. System 10 will provide customised menus for the user at step 42 based on the user database 28 and the information database 30. The user can construct a message (to be described later) and can send it to another user, for example, in Australia at step 44. The message can be constructed with the assistance of the audio visual files 32-36. The message will be sent in correct Japanese with little effort from the Australian user. The message will be delivered to the exchange database 38 and the message can be received by the Australian user at step 46. The Australian user will be able to read the message in English and have access to any of the audio visual files 32-36 selected by the Japanese user to be included in the message.

1st Preferred Embodiment

Figure 3:
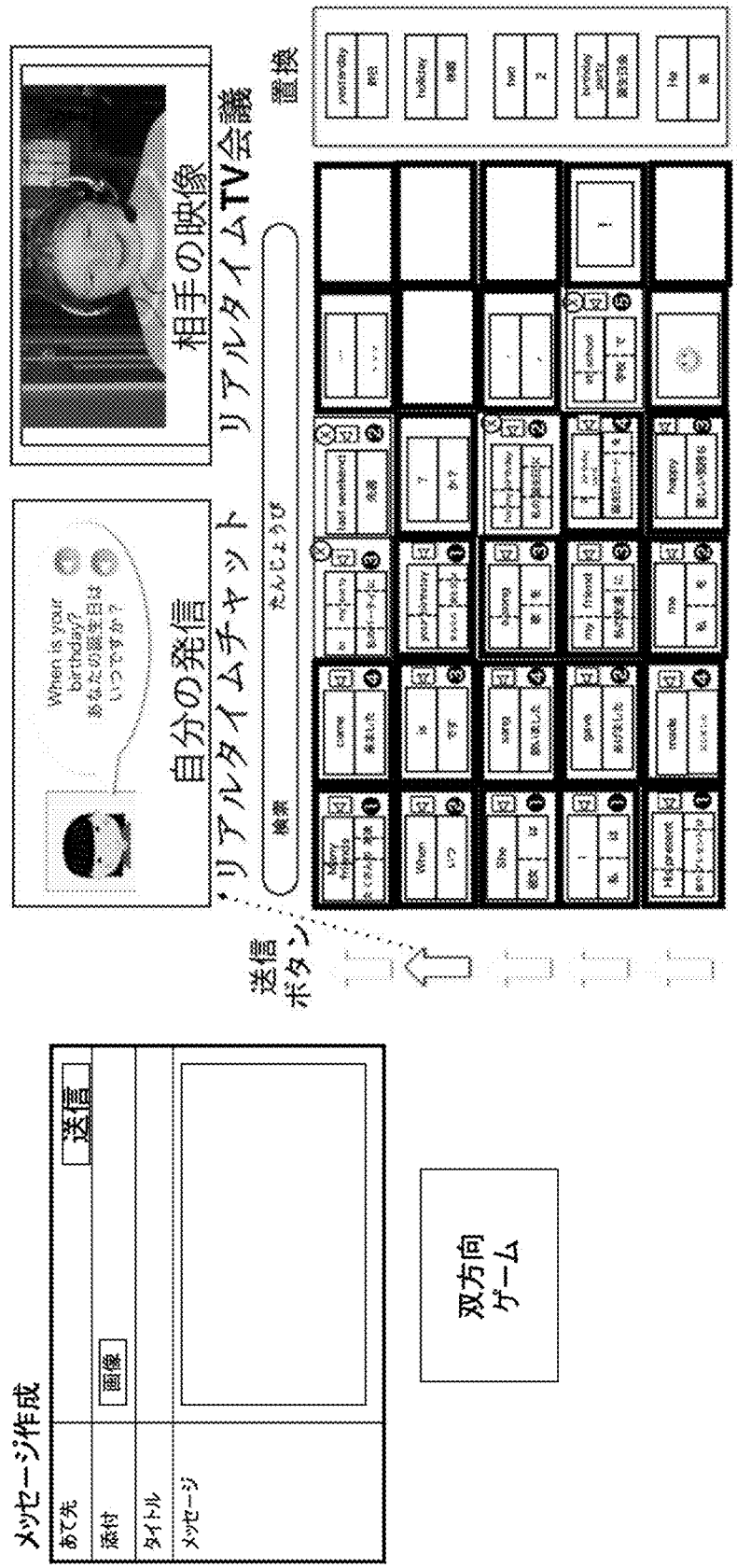
FIG. 3 is a practical example of a computer input screen for a Japanese user.

FIG. 3 shows an example of a typical input screen 48 which would appear on the computer 12 of the Japanese user. The input screen 48 is divided into a number of operational windows for assistance to the user to communicate to the Australian user. The windows may include an email window 50, a real time conversation window 52, a real time video conferencing window 54, a message construction window 56.

The email window 50 includes an address selection 60 where the email address of the addressee can be typed or entered from a drop down box. Any attachments to be included in the message will be listed in the attachment selection 62. The heading of the message will be entered in the title selection 64 and the message itself will be shown in the message box 66. A SEND button 70 is provided to allow the constructed message to be forwarded to the Australian user as an email when the message is completed. A message can be typed directly in the message box 66, with or without translation, or can be inserted by use of the message construction window 56. If an on-line conversation is required, rather than sending an email message, then the real time conversation window 52 can be used. Similarly, a message can be typed directly with or without translation, or can be inserted by use of the message construction window or can be inserted by use of the message construction window 56 and forwarded when the SEND button 68 is activated.

The real time video conferencing window 54 uses a camera (not shown) to provide video conferencing using established techniques. A mute button 72 can prevent the audio from being transmitted. Buttons 55 can be provided to provide access to interactive games. The games can be played using foreign languages, in which case, the message construction window 56 can be used to construct questions and answers in foreign languages, or it can be language independent and allow the users to interact with each other in a fun manner to gain confidence with the use of the system.

Details of the message construction window 56 will be described later but an outline of the message construction window 56 will be explained here. The message construction window 56 is divided into a grid which can be used to construct a sentence or phrase by arranging words, icons, images, etc into one of the 5 English sentence patterns.

The message construction window 56 also has a sentence windows 74, which display completed sentences or phrases using a Double Palette (Outer Box and Inner Box). These sentences or phrases can be put into a message with just one click of a mouse or other pointing device and normally mouse clicking is used. The contents of the Double Palette (Outer Box and Inner Box) will vary dependent on the subject matter that the message will contain.

Figure 4:
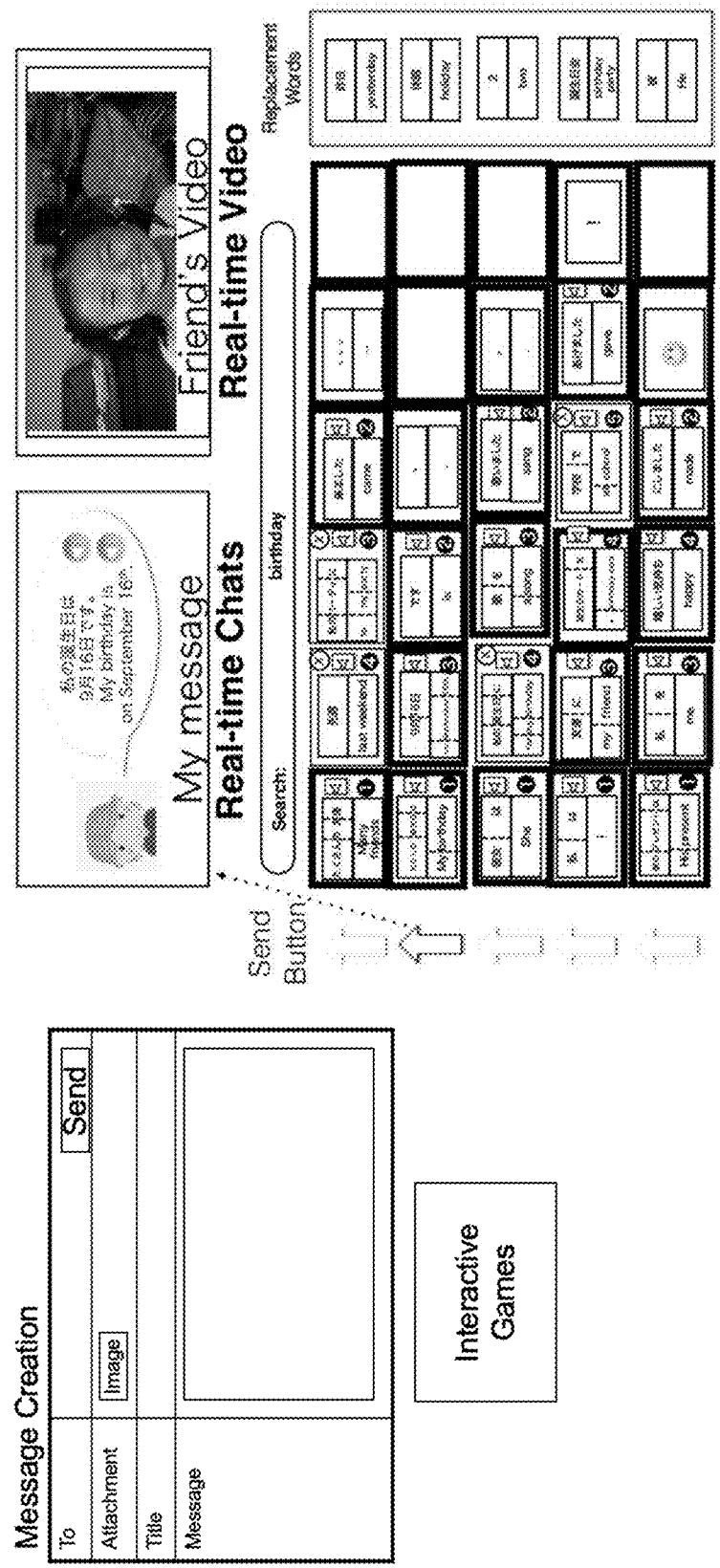
FIG. 4 is a practical example of a computer input screen for an Australian user.
Figure 5:
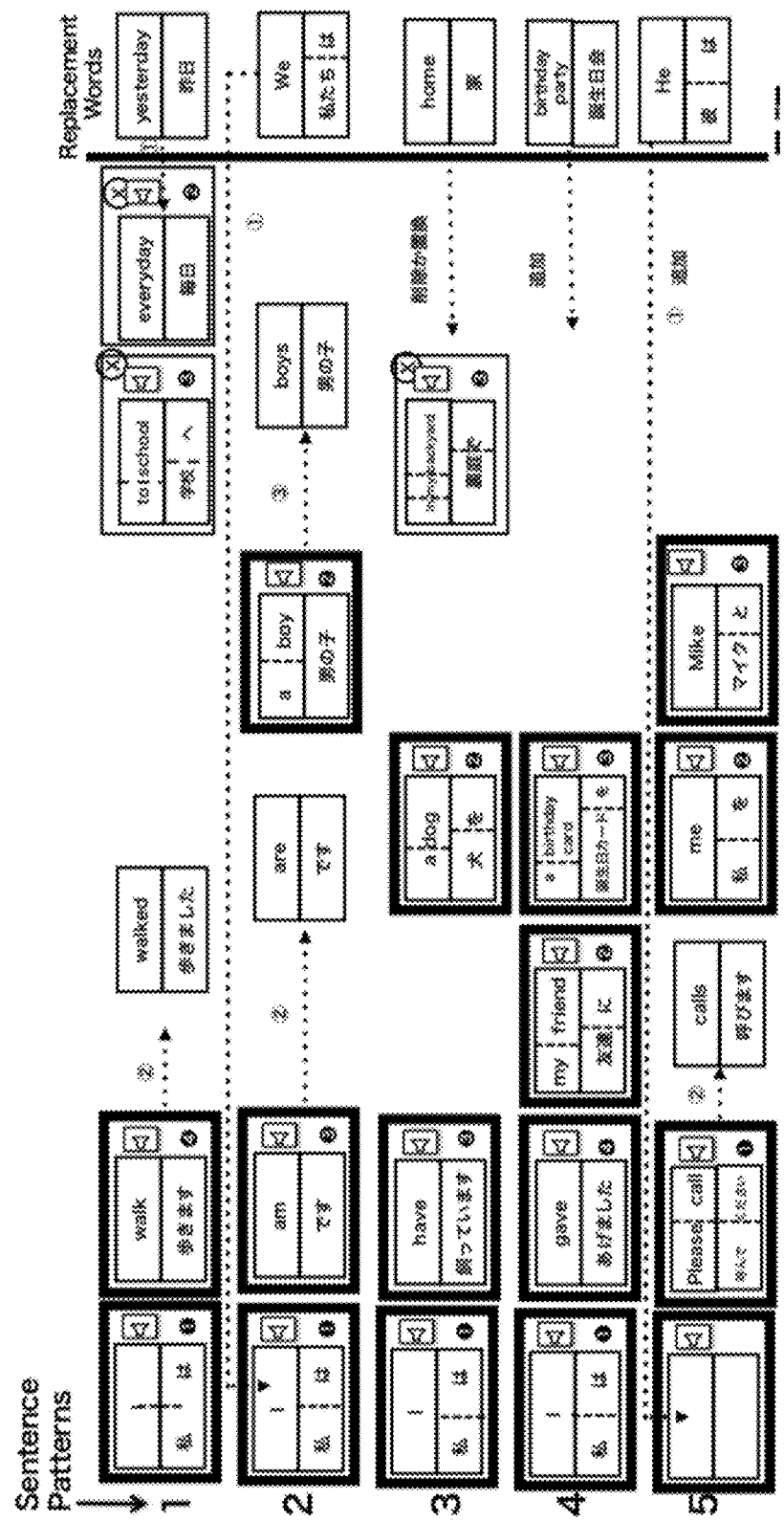
FIG. 5 is an enlarged view of the message construction window shown in FIG. 3.

Normally, a desired category is chosen by the user from a drop down box or menu option 78 (in the example shown in FIGS. 3 and 4 the category "Birthday" has been chosen), but can implement without choosing a specific category (Such as in the implementation example of FIG. 5)

The categories can vary to select the intended content of the message, for example, "Birthday", "School", "Hobbies", "Family", "Pets", etc, to allow a variety of subjects to be discussed. When a different category is selected, the words, icons, images, etc will change to match that category.

FIG. 4 illustrates an example of a typical input screen 48A, which would appear on the computer 14 of the Australian user. This input screen 48A is for the Japanese user to convert a sentence that is entered in English into Japanese, which is the reverse system of FIG. 3 that shows an input screen for converting Japanese into English.

In order to avoid duplication and repetition of description, integers in FIG. 4 corresponding to integers in FIG. 3 have been given an "A" suffix, and detailed descriptions are abbreviated. For example, message construction window 56 in FIG. 3 is message construction window 56A in FIG. 4.

Below, the above described message construction window 56 is described in detail to make it easier to understand the above-described Double Palette structure.

The 1st character of the system under the preferred embodiment is to use English as a key language and also use 5 sentence patterns of English as the language structure, and the 2nd character is to be equipped with the so called Double Palette structure, which decomposes and converts each elements of the 5 sentence patterns as needed.

Under the preferred embodiment, the display field for each of the elements of the 5 English sentences patterns are called the Outer Box. Each unit of the Outer Box has words with the same meaning between the 1st and the 2nd languages and they are linked with each other and memorised on the system.

By replacing the Outer Box units with other phrases and words, any language can edit its sentences by securing its grammatical structure.

This will enable replacing with the 2nd language by maintaining an accurate sentence structure of the 1st language.

Also a display field inside the above-described Outer Box, where its contents are decomposed into parts of speech is called an Inner Box.

Even if a word (parts of speech) of the Inner Box is replaced and its sentence edited (customised), the fundamentals of the language grammar will not be affected at the parts of speech level, and when one of the Inner Box word (part of speech) is changed, other parts of speech within the sentence will also change automatically based on the English grammar, therefore the grammatical accuracy of English will not be affected but can maintain increased level of flexibility with expressions and also allow accurate replacement with other languages.

As for the Outer Box, each language is configured to link with each other based on its meanings and therefore cannot set up original boxes, while for the Inner Box, each language can set unique divisions.

By this, even if replacements and contents changes occur at the parts of speech level on one language, it can maintain the grammatical accuracy of the corresponding other language.

Below, detail of a Double Palette structure is described with FIGS.

Under the preferred embodiment, English sample sentences are allocated vertically on the screen, with the following order from above; 1st sentence pattern (80), 2nd sentence pattern (90), 3rd sentence pattern (100), 4th sentence pattern (110), and 5th sentence pattern (120)

These sample sentences will automatically be shown as each of the sentence pattern when sentences are selected from the menu option 78 and therefore can avoid the complexity on the part of the user to choose which sentence pattern should be used to construct a message.

Here, sentence 80 of the 1st sentence pattern is described by Outer Box 81 as a display field for subject S, Outer Box 82 as a display field for predicate verb V, and Outer Box 86 and 87 as a display field for modifiers M.

Sentence 90 of the 2nd sentence pattern is described by Outer Box 91 as a display field for subject S, Outer Box 92 as a display field for predicate verb V, and Outer Box 95 as a display field for complement C.

Sentence 100 of the 3rd sentence pattern is described by Outer Box 101 as a display field for subject S, Outbox 102 as a display field for predicate verb V, Outer Box 104 as a display area for objective O, and Outer Box 106 as a display field for modifier M.

Sentence 110 of the 4th sentence pattern is described by Outer Box 111 as a display field for subject S, Outbox 112 as a display field for predicate verb V, Outer Box 114 as a display field for the 2nd objective O2.

Sentence 120 of the 5th sentence pattern is described by Outer Box 121 as a display field for subject S, Outbox 122 as a display field for predicate verb V, Outer Box 124 as a display field for objective O, and Outer Box 125 as a display field for complement C.

Also, the inside of each Outer Box described above will be further divided into multiple Inner Boxes depending on the sentence pattern.

In the example of Outer Box 106 as the display field for modifier M for the sentence 100 of the 3rd sentence pattern, Inner Boxes 106A and 106B and 106C are allocated respectively for each of the parts of speech "in", "my", and "backyard", wherein each of these Inner Boxes 106A, 106B and 106C can be identified as separate Inner Boxes by dividers such as broken lines. It is possible to have two or more than four Inner Boxes in one Outer Box. For the corresponding 1st language, Japanese, phrase 裏庭で ("in backyard" in English) is further divided into parts of speech 裏庭 ("backyard" in English) で ("in" in English) and Inner Boxes 106D and 106E are allocated to them respectively.

As described earlier, Inner Boxes can set original divisions for each language, and for example, even when the display contents are separated into two Inner Boxes in the 1st language, the display contents do not need to be separated into tow Inner boxes on the 2nd language. Rather it can be displayed with one or three or more Inner Boxes. By this, it will become possible that for a particular language, even when contents are changed through replacing each part of speech, the corresponding other language can maintain its grammatical accuracy.

In each of the Outer Box shown on FIG. 5, the lower column describes the 1st language (in this case Japanese) and the upper column describes the 2nd language (in this case English). Therefore, the 1st language of the lower column will be replaced with the 2nd language of the upper column in Outer Box units.

When sentences are edited on a Mail system, by default, it will display the right word order in the 1st language, and based on indicators such as numbers (for example white numbers on FIG. 5) which are for rearranging Outer Boxes of the 2nd languages, users will re arrange the order of each of the Outer Boxes using a mouse etc. On the other hand, under Chat (Talk) operation, Outer boxes depicted in the 2nd languages are automatically rearranged into the right order, and is set to immediately transmit the sentences. By default, it displays in the order of the 1st language, but will automatically rearranged into the correct order of the 2nd language.

When sending sentences by Mail, due to the purpose of Mail usage, in many cases immediate message creation is not required, therefore, as earlier described in the inventor's proposed technology published under U.S. Pat. No. 5,124,469, the basic flow would be to use a sentence arranged in the 1st language order as a base and then construct a message in the 2nd language by rearranging the order and composing it. In this case, there will be effects on users to study grammars.

On the other hand, when sending sentences by Chat (or Talk), immediate communication will be important due to the underlying purpose of the Chat (or Talk), and therefore, in order to secure the immediacy and rearrange it into a correct sentence order instantly, word replacements and Outer Box rearrangements will be done automatically.

The screen shown on FIG. 5 describes an operational process of the Chat (or Talk), wherein the 1st language Japanese will be replaced with the 2nd language English, and also describes how English is rearranged into a correct sentence pattern. After this, the user (Japanese user) can click the arrow shaped send button 68 on the left side of the screen where the sending sentence patterns are shown, and can easily send the intended English sentence to a counterpart user (English speaking user).

In this case, numbers on each sentence as a reference will indicate the order of the 1st language. This can facilitate the users to work out the intended process even if their language ability is insufficient.

In addition, for both Mail and Chat (or Talk), the above procedure can be reversed, and it is also possible to switch the Outer Box order between the 1st language and 2nd language (this means in Mail, allowing the 2nd language to be automatically rearranged into a correct word order, and in Chat (or Talk) allowing users to rearrange into a correct order themselves).

Also on the screen shown on FIG. 5, for sentence 80 of the 1st sentence pattern, the Japanese word displayed on Outer Box 87 for modifier M is shown as "everyday", however when this is edited by user 200 to "yesterday" as shown on the word replacement box 89 (Conversion process (1)), the word "walk" shown on Outer Box 82 as the predicate verb V will also automatically edited and changed to "walked" (Conversion process (2)).

In the same way, for sentence 90 of the 2nd sentence pattern, the Japanese word displayed on Outer Box 91 for subject S is "I" by default, but when Japanese user 200 edits this (Conversion process (1)) to "We", the verb "am" shall also be automatically edited and changed to "are" 92A, and the word "a boy" that is displayed in Outer Box 95 for modifier M shall also automatically be edited to "boys" (Conversion process (3)). This edited Japanese sentence will be replaced with English after the editing process (and same with the example below)

In the same way, for sentence 100 of the 3rd sentence pattern, by default the Japanese word displayed on the Outer Box 106 for modifier M is 裏庭で ("in my backyard" in English), and this Outer Box is further separated into Inner Box 106 D for the 裏庭 part and Inner Box 106E で part, and is possible to replace the 106D word 裏庭 with 家 ("home" in English). When this happens, on the 2nd language English side, Outer Box 10 which displays "in my backyard" (which is separated into Inner Box 106A "in", Inner Box 106B "my", and Inner Box 106C "backyard"), the Inner Box 106C "backyard" will be replaced with "home" shown on word replacement box 109. In that case, the preposition of the sentence will also be automatically corrected and the sentence will become "at my home".

Further, because this is an edit of the Outer Box 106 modifier M, it is possible to delete this Outer Box 106 itself.

Similarly, for the 4th sentence pattern 110, when a Japanese user 200 edits and adds a word 誕生日会で ("at the birthday party" in English), because "at the birthday party" is a modifier M, it is possible to add the Outer Box "at the birthday party" itself.

Similarly, because the 5th sentence pattern 120 is an imperative sentence, by default the Japanese word shown on Outer Box 121 for subject S is abbreviated, but when editing this into a declarative sentence, and when a Japanese user 200 edits and add the word 彼は ("He" in English) on Outer Box 121 for subject S, ((1) Conversion process) then in response, the Japanese word 呼んでください ("Please call" in English)shown on predicate verb V's Outer Box 122 will also be automatically edited ((2) Conversion process) into a word 「呼びます」 ("calls" in English).

In addition, for word replacement boxes 89, 99, 109, 119, 129, these are defined based on contents of each sentence patterns, but all replacement boxes 89, 99, 109, 119, 129 will be updated to various other replacement words when each of the displayed contents are updated.

Also for white numbers inside black circles described inside each Outer Box, these are for rearranging the orders of the Outer Boxes to make them into accurate sentences, but as formerly described, configurations on sending sentences by Mail and Chat are different from each other, therefore operation processes regarding these white numbers will be different too.

For these white numbers, especially when creating messages on Mails, immediate actions are not required as described earlier, therefore users can follow the white numbers and rearrange the Outer Boxes from the correct order in the 1st language and sentences in the 2nd language in the correct order. Also on the settings, the white numbers can be deleted, or the sentence can be depicted in just the 2nd language by deleting the depictions of the 1st language. In this case, the Japanese user 200 can engage with the process as an educational activity.

Also in FIG. 5, there are speaker shaped buttons 132, which are described inside each Outer Box. As described earlier, this button is to play the voice sound or bring its sound level to 0 by muting it. The "x" button 133 placed on top right corners of the Outer Boxes for modifier M such as 86, 87, 106, are for deleting unnecessary modifier M Outer boxes. Outer Boxes for S, V, O, and C are prohibited to delete and therefore do not have the "x" button 133.

Under the preferred embodiment of the invention, as described above, when one of the Outer Box descriptions is edited within a sentence, descriptions of the related other Outer Boxes will be automatically edited. For example, automatic editing occurs in the following cases.

When editing and changes are made on nouns between singular and plural nouns or to 3rd person singular nouns, verbs will be corrected automatically.

When editing and changes are made on the types of pronouns (to singular, plural or different genders), pronouns in the whole sentence will be corrected automatically.

When editing and changes are made on the tense of the verbs, the tense in the whole sentence will be edited automatically.

When reversing the order of a be-verb of subject S and a predicate verb V, the sentence will be automatically edited into a question sentence.

Below explains the features associated with the editing process of replacing the 1st language Japanese into the 2nd language English under the preferred embodiment of the invention.

When English sentences are actually being created, sample sentences are already registered under one of the 5 sentence patterns. And the required foreign language is linked to the English sentences and registered by Outer Boxes units.

The basic allocation of the Outer Boxes will be maintained expect for when modifier M is deleted.

When users are creating sentences, they can edit the contents into what they want to write (communicate), but even in that case, Outer Boxes cannot be deleted except for modifier M. Even when editing takes place the sentence pattern and the accuracy of the English grammar will be maintained. Since modifier M is outside of basic elements S, V, O, and C, accuracy of the overall sentence grammar will be maintained even if it is deleted.

Also a change on an Outbox of a particular foreign language will be related and corresponding to the changes on Outboxes of English and other foreign languages, and even if a change on an Outbox occurs based on the language's particular grammar, corresponding changes on the Outboxes' of English and other foreign languages will occur simultaneously.

By changing the tense, singular/plural of nouns, and genders etc. among the parts of speech of the Inner Boxes, the related verbs, prepositions etc. will change based on the grammatical rules of English. The Inner Boxes are uniquely allocated (positioned) depending on the foreign language's characteristics, and not necessarily placed in accordance with the Inner Box of the English order. Similar to English, Inner box contents of other foreign languages can be replaced with equivalent parts of speech. And the changes made on Inner Boxes of another foreign language will be independent of the Inner Boxes of the corresponding English and other foreign languages, where changes will be made based on each different foreign language rule and therefore will not be affected by each other.

Also by changing the allocation (position) of the verbs of declarative sentences (or question sentences), the subjected sentence will change to question sentences (or declarative sentences) based on the English grammar rule.

Even when sentences are edited at the parts of speech level, the 5 sentence patterns will be maintained the same at the Outer Box level, therefore, Inner Boxes can secure flexibility at the parts of speech level and also enable reasonable replacements between languages while maintaining the overall grammatical accuracies of the sentences.

Figure 6:
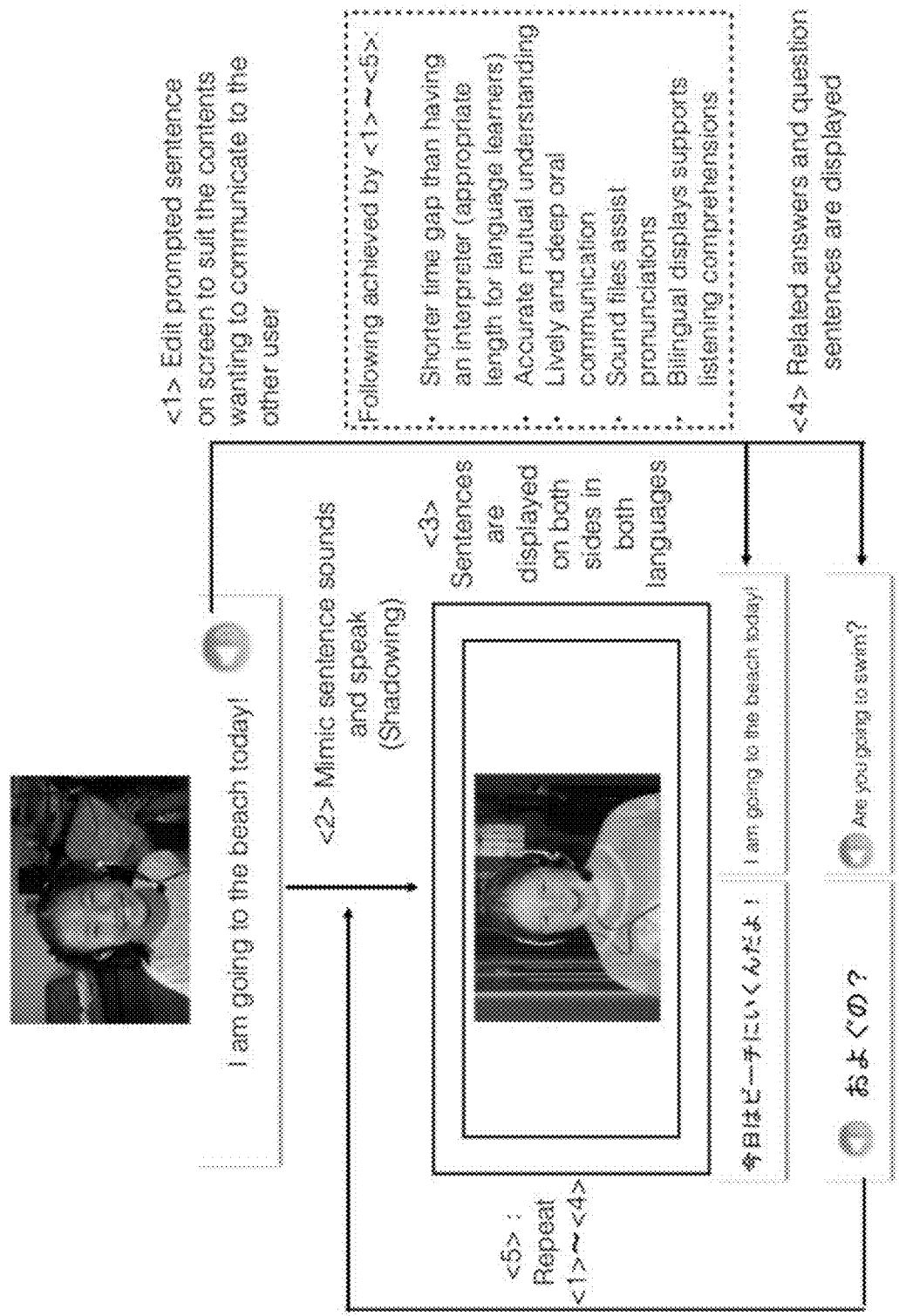
FIG. 6 is a flow chart to describe the conversation mechanism under the preferred embodiment.

Next, FIG. 6 shows a flow diagram to explain in order the mechanism of conversations under the preferred embodiment (Chat and Talk).

[1] Japanese user 200 will start the operation under the preferred embodiment.

[2] When a sentence a user wants to converse is prompted on the message construction window 56, the user will select the sentence, and if not, will search among sample sentences to find a sentence that is close to what is being desired to transmit.

For example, it is assumed that when a user wants to send "I want to go to beach today!", the user has found a sample sentence that is close 今日は山にいくんだよ!("I will be going to the mountain today!" in English)

In this case, when the user edits "to the mountain" into "to the beach", then the Japanese sentence "I am going to the beach today" in Japanese will be replaced with the English sentence "I am going to the beach today!" in an accurate order (210) (Refer to box 210, explanation <1>.

[3] Once editing is done click the arrow shaped sending button 68.

[4] When sending button 68 is clicked an English sound file based on the English text "I am going to the beach today!will play."

[5] The Japanese user 200 hear the played sound file by headsets etc and will mimic and speak this English sound (also called "shadowing" process) (Explanation <2>). This spoken voice will be transmitted to the English 220.

[6] English user 220 will view the displayed text "I am going to the beach today!", and hear the transmitted voice "I am going to the beach today!". Also the text that will be displayed will not only be the English sentence "I am going to the beach today!" (Refer to box 232) but also will be accompanied with the display of the original Japanese sentence 今日はビーチにい くんだよ! (Refer to box 231) (Explanation <3>). By this, the Japanese user 200 and English user 220 will be able to communicate and mutually understand each other.

[7] Next, when the English user 220 starts operating under the preferred embodiment system and a sentence that wants to converse (reply) is prompted on the message construction window 56A, the user selects the sentence, and if not, will search for a sample sentence that is close to what is being desired to transmit. (Explanation<4>)

For example, when the user wants to reply with a sentence meaning "Are you going to swim?" and the sentence "Are you going to swim?" is prompted, (refer box 242) it will be replaced with the Japanese sentence "およぐの" ("Swimming?" in English) in an accurate order (refer to box 241).

After this, the arrow shaped sending button 68 will be clicked.

[8] After which, the English user 220 will operate similarly to the above described [4]-[6] and by doing so, the user can do both Chat and Talk at the same time and can communicate and mutually understand each other smoothly with the Japanese user 200.

After which, conversation will proceed by repeating the above described operation [1]-[8].

The preferred embodiment has both Chat and Talk functions described above, and thereby following effects can be generated.

Can shorten conversation gaps compared to communication through an interpreter.

Can communicate and mutually understand accurately between conversation parties.

Can engage in lively and deep level oral based communication.

The sound filed based "shadowing" process assists voicing in correct pronunciation.

The texts sent from the other party will be shown in both languages, which supports listening comprehension.

In this way, under the preferred embodiment of the multilingual exchange system, communication using accurate sentences will become possible in any languages, and because texts will be displayed in multiple languages to both side of the users who are engaged in conversation, communication and mutually understanding between both parties will be enhanced.

Also, Shadowing Effect can be expected through speaking based on listening to playing sound files, which will enable accurate speaking and improvement of communication and mutual understandings between the parties.

Also by showing visual materials such as photos and drawings that are aligned with the sentences of each language on designated screens (As in FIG. 3 and FIG. 4, real-time Chat windows 52, 52A to display icons of each other, as well as real-time Video conference (video chat) windows 54, 54A where can see each other), improved effects on communication and comprehension can be achieved.

2nd Preferred Embodiment

Figure 7:
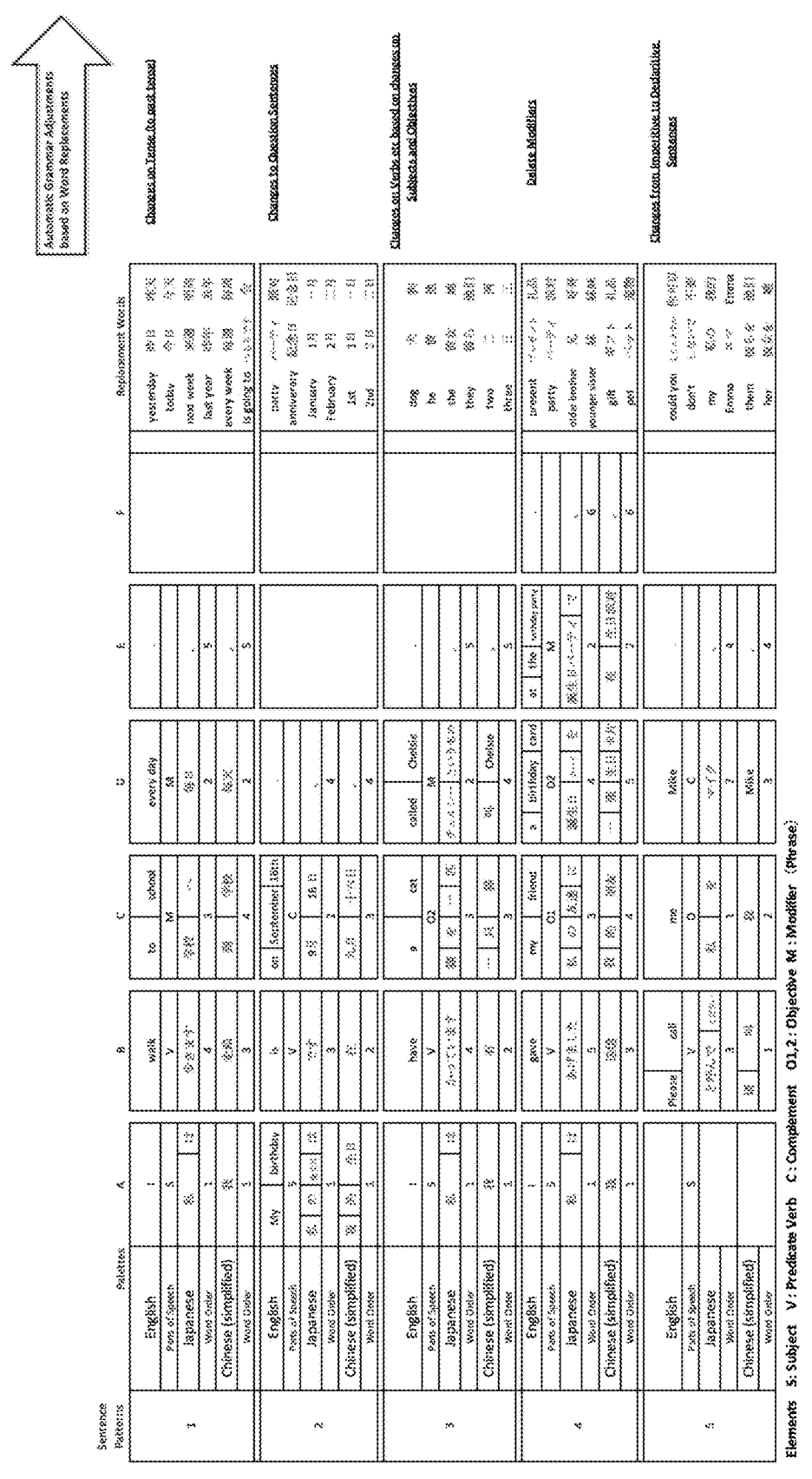
Figure 8:
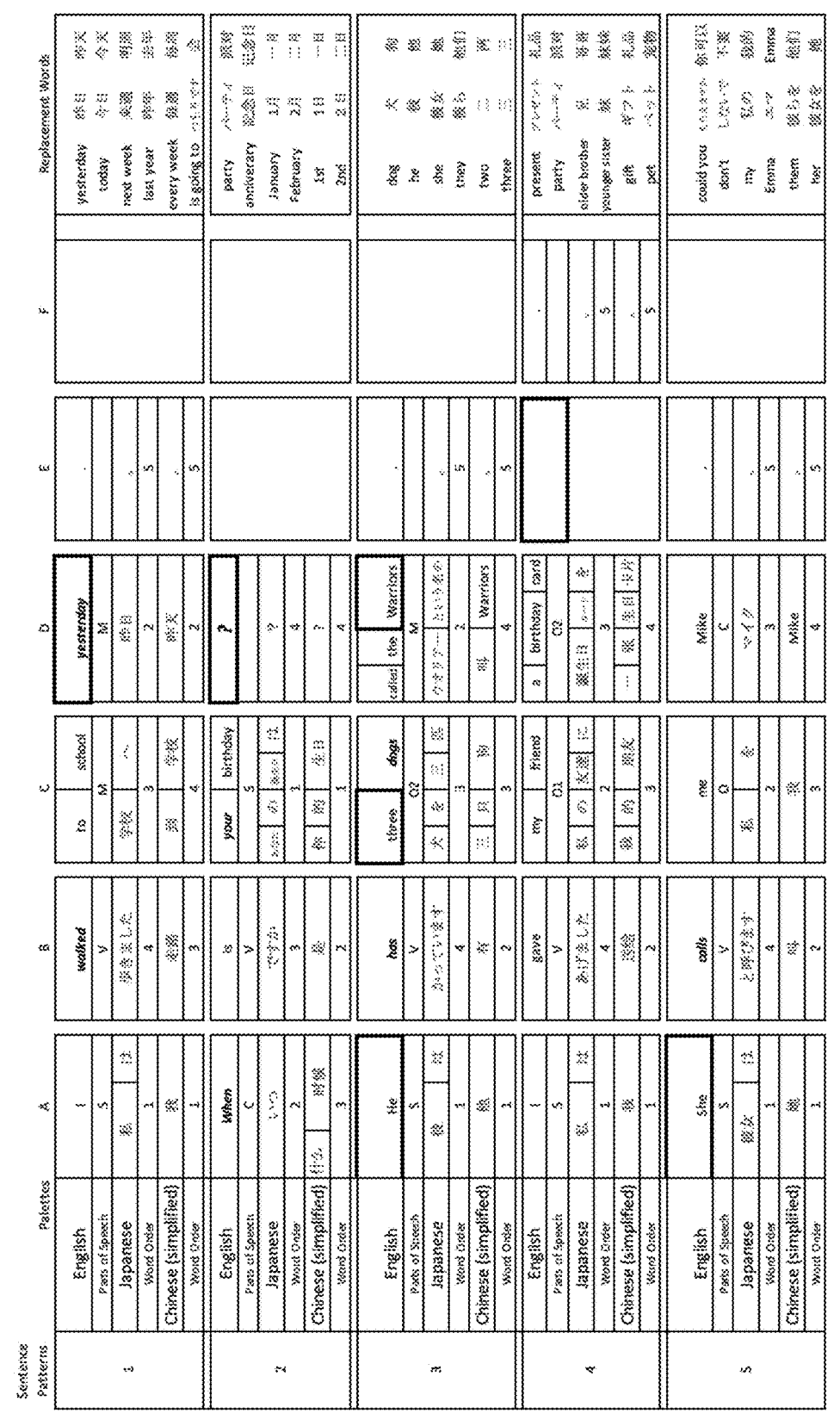

Next, FIG. 7, and FIG. 8 describe the 2nd preferred embodiment of the invention. The input screen for the 2nd preferred embodiment is basically similar to the input screen of the 1st embodiment, wherein uses English as a key language, one of the 5 sentence patterns to replace languages, and carries a Double Palette structure which includes Inner Boxes that divides parts of speech of the display contents in each of the Outer Boxes S, V, O, C, and M, which points are similar to the 1st preferred embodiment described above.

However this 2nd preferred embodiment is different from the 1st preferred embodiment on the point that it directly shows on the screen that when replacements are made between the 1st language Japanese and the 2nd language Chinese, English will act as the intermediate language for the replacement. Therefore it is configured in the way that each sentence pattern 280, 290, 300, 310, and 320 will use Outer Boxes S, V, O, C, and M to replace words with the same meanings between English, Japanese, and Chinese.

Here, a sentence for the 1st sentence pattern 280 is described by Outer Box 281 as the display field for subject S, Outer Box 282 as the display area for predicate verb V, Outer Box 286 and 287 as the display fields for modifier M, Outer Box 288 as the display field for punctuations.

A sentence for the 2nd sentence pattern 290 is described by Outer Box 291 as the display field for subject S, Outer Box 292 as the display field for predicate verb V, Outer Box 295 as the display field for complement C, Outer Box 298 as the display field for punctuations.

A sentence for the 3rd sentence pattern 300 is described by Outer Box 301 as the display field for subject S, Outer Box 302 as the display field for predicate verb V, Outer Box 304 as the display field for objective O, Outer Box 306 as the display field for modifier M, Outer Box 308 as the display field for punctuations.

A sentence for the 4th sentence pattern 310 is described by Outer Box 311 as the display field for subject S, Outer Box 312 as the display field for predicate verb V, Outer Box 313 as the display field for the 1st objective O1, Outer Box 314 as the display field for the 2nd objective O2, Outer Box 315 as the display field for modifier M, Outer Box 318 as the display field for punctuations.

A sentence for the 5th sentence pattern 320 is described by Outer Box 321 as the display field for subject S, Outer Box 322 as the display field for predicate verb V, Outer Box 323 as the display field for objective O, Outer Box 325 as the display field for complement C, Outer Box 328 as the display field for punctuations.

The inside of each Outer Box described above will be divided into multiple Inner Boxes depending on sentence configurations.

For example, Outer Box 295 for a sentence of the 2nd sentence pattern 290 is described as "on Sep. 16th" in English but this is divided by particles into Inner Box 295A that shows "on" and Inner Box 295B that shows "September", and Inner Box 295C that shows "16th".

And Outer Box 295 for the sentence of the 2nd sentence pattern 290, shows "9 月 16 日" in Japanese and is divided by parts of speech into Inner Box 295D that shows "9 月" and Inner Box 295E that shows "16 日", but on the other hand in Chinese, it is shown as "九月十六日" which is divided by parts of speech into Inner Box 295F that shows "九月" and Inner Box 295G that shows "十六月".

When Japanese is the 1st language, first, the Japanese as the 1st language will be replaced into the intermediary language English as the first process, then it will be replaced from the intermediary language English to the 2nd language Chinese, by which process the accuracy of grammar during the transition from the 1st language to the 2nd language will be maintained.

Further, in FIG. 7 and in FIG. 8 to be described later, the intermediary language English will be set in the accurate order.

Also FIG. 8 describes the situation after edits are made on FIG. 7 based on specific purposes, under the preferred embodiment. Further, the Outer Boxes indicated on FIG. 8 are numbered by adding 100 to each of the corresponding Outer Box numbers on FIG. 7, and detailed explanations on these will be abbreviated.

An example using the 1st sentence pattern shows how a sentence will be edited and changed into past tense based on changes in tense.

In FIG. 7, when the Japanese word 毎日 ("everyday" in English) is displayed on Outer Box 287 for modifier M on sentence 280 of the 1st sentence pattern, and this is being replaced with 昨日 ("yesterday" in English) in word replacement box 289 as shown in Outer Box 387 for modifier M, then in that case, 歩きます ("walk" in English) shown on Outer Box 282 for predicate verb V will automatically change to 歩きました ("walked" in English) as shown on Outer Box 382 for predicate verb V in FIG. 8.

As for the replacement process from the 1st language Japanese to the intermediary language English, the Japanese word 昨日 as shown in the Outer Box 387 for modifier M will be replaced with "yesterday", and also 歩きました as shown on Outer Box 282 for predicate verb V will be replaced with "walked" as shown on Outer Box 382 for predicate verb V in FIG. 8.

As for the replacement process from the intermediary language English to the 2nd language Chinese, the English word "yesterday" shown in Outer Box 387 for modifier M will be replaced with the Chinese word 昨天 ("yesterday" in English), but "walked" shown on Outer Box 282 for predicate verb V will remain the same Chinese word 走路 ("walk" in English) as shown on Outer Box 382 in FIG. 8, because there is no changes of tense in the Chinese language.

In addition, when the Japanese word 毎日 ("everyday" in English) is replaced with the Japanese word 来週 in the word replacement box 289 as shown in the Outer Box 387 for modifier M, in that case, the English word "walk" will change to "will walk". Further, this can be changed to "is going to walk" as shown in the Outer Box for predicate verb V 382.

Also an example of using a 2nd sentence pattern describes how editing takes place when changing a declarative sentence to a question sentence. Only a summary of the editing process will be provided below to avoid redundant explanations.

That is, when a Japanese period "。" as shown in Outer Box 298 (In English "." or also "。" in Chinese) is edited and changed to a question mark "?" in a sentence pattern comprising S, V, and C, in such case, "on September 16th" shown on Outer Box 295 for complement C will automatically change to "when" on Outer Box 381 for complement C and will be positioned at the beginning of the sentence. Also "My" will automatically change to "your". Also in some cases, positioning of be-verb can automatically change to the beginning of a sentence and convert to a question sentence.

Also, on sentence 290 of the 2nd sentence pattern, Outer Box 291 for subject S is shown as 私の誕生日は in Japanese and 私, の, 誕生日, は are separately shown as Inner Boxes 291C, D, E, F. In the English sentence, this is shown as "My birthday" where "My" and "birthday" are separately shown as Inner Boxes 291A, and B.

Further, in the Chinese sentence, this is shown as 我的生日 where 我, 的, 生, 日 are separately shown as Inner Boxes 291G, H, and I.

Also on sentence 390 of the 2nd sentence pattern, which is after the conversion, Outer Box 391 for subject S is shown as あなたの誕生日は in Japanese and あなた, の, 誕生 日, は are separately shown as Inner Boxes 391C, D, E, and F. In the English sentence, this is shown as "Your birthday" and "Your" and "birthday" are separately shown as Inner Boxes 391A, and B. Further in the Chinese sentence, this is shown as 你的生日 and 你, 的, 生, 日 are separately shown as Inner Boxes 391G, H, and I.

In the example of using a 3rd sentence pattern, it describes how editing and changes are made when each part of speech changes based on changes in nouns for subject S and objective O. However, to avoid redundant explanations, only the relationship between a Japanese sentence and an English sentence will be explained and descriptions on the boxes will be abbreviated.

That is, when a pronoun "I" is replaced with "He", then the predicate verb V "have" will automatically change to a third person singular form "has". Also objective O2 that describes animals changes to a plural form of "three dogs".

In the example of using a 4th sentence pattern, it describes how editing and changes take place when modifier M is deleted.

Modifier word (or phrase) M is not an element of any of the S, V, O, and C, therefore as described earlier, it is possible to delete or add this, and therefore in such case, "at the birthday party" can be deleted, and even when the modifier word (phrase) M is deleted, grammatical accuracy of the sentence will be maintained.

In the example of using a 5th sentence pattern, it describes how editing and changes take place when an imperative sentence is converted into a declarative sentence.

In case of such imperative form, subject S is abbreviated even if it belongs to S, V, O, and C sentence patterns, therefore, when converting into a declarative sentence, subject S will be inserted, and accordingly, other elements (for example predicate verb "call" will be automatically changed to predicate verb "calls") will be changed automatically.

FIG. 9 shows a message screen 530 where messages sent from the Japanese user 200 using the screens shown in FIGS. 3 to 6 are received. This screen is for the Australian user. The message screen 530 has a number of panels which are in common use in email applications. The panels include a date panel 532, a sender panel 534, an age panel 536, a birthday panel 538, a title panel 540 and a message panel 542. The panels can vary to suit requirements and can be deleted or substituted for relevancy. A reply button 544 is provided so the Australian user can respond to the Japanese user. As previously discussed the message was constructed by the Japanese user in Japanese but is received by the Australian user in the English language as a typical email message. The construction of the message "My favourite sport is sumo" can be readily seen in FIGS. 4 and 6. In this example the word "sumo" is highlighted which indicates additional information is available on that word. This information may be descriptive text 548, pictures 550, video 552 or audio 554 which can be accessed from the audio visual panel 546. If a video is available, the video button 552 will be highlighted and can be viewed by clicking on that button. This provides additional material to better explain the contents of the message. Of course the buttons and layouts of each screens are not limited to these.

FIG. 10 shows a message screen 560 where messages sent from an English speaker user 220 using the screens shown in FIGS. 3 to 6 are received. This screen is for the Japanese user. Again, in order to avoid duplication and repetition of description, integers in FIG. 9 corresponding to integers in FIG. 10 have been given an "A" suffix; for example, reply button 544 in FIG. 9 is reply button 544A in FIG. 10. In this example the Australian user has sent a message "My favourite sport is footy". As previously discussed the message was constructed by the Australian user in English but is received by the Japanese user in the Japanese language as a typical email message. The construction of the message "My favourite sport is footy" can be readily seen in FIGS. 3 and 5. In this example the word "footy" is highlighted which indicates additional information is available on that word.

The application of the invention is particularly effective between students in Australia/New Zealand where demand for Asian language/culture learning is high and East Asian countries such as Japan, Korea, Taiwan, China, and Thailand (not limited to these countries) where demand for English learning is high.

Also, the invention can be applied between North America and Latin America, Europe and Asia (European users can interact during school time with Asian counterparts in the evening), and other regions in the world where combinations can be made.

The invention can be used for all age groups and allows cross generation exchange or/and cross cultural exchange.

The invention can be used for business communications, social objectives, and various forms of exchange between different countries and/or races.

Although the preferred embodiment is Internet based the invention is to be understood to be not limited to such an environment. The system could be LAN based, IP based, wireless based or use any other suitable communication method. The pointer device is preferably mouse based but could be stylus based or finger based using touch sensitive screens. The operation of the system could also be activated by voice recognition. The screen may be a computer monitor, television, personal digital assistant (PDA), mobile phone, hand held device, laptop computer or any other electronic communication device. The contents server 26 can be substituted by media directly accessible by the user, for example, CD-ROM, hard disk, memory device, etc. An installation program could look for the contents server 26 or any other device or memory location. For use with devices having small screens, for example, mobile phones, the grid elements may be list based elements.

DESCRIPTION OF NUMBERS

10 multilingual exchange system
12, 14 computer
16, 22 message creation menu
18, 20 message view menu
24 web based platform
26 contents server
28 user database
30 information database
31, 331A, B, 431A, B numbers showing the order (sequence)
32 pictures such as JPEG
34 audio files such as WAV
36 video files such as AVI
38 exchange database
40, 42, 44, 46 steps
48, 48A input screen
50, 50A electronic Mail window
52, 52A real-time Chat window
54, 54A real-time Video Conferencing (Video Chat) window
56, 56A message construction window
60, 60A address selection
62, 62A attachments
64, 64A title selection
66, 66A message box
68, 68A, 70, 70A send button
72, 72A, 132, 211 play, mute button
74, 74A sentence window
78, 78A menu options
80, 280, 380 sentence of 1st sentence pattern
81, 82, 86, 87, 91, 92, 95, 101, 102, 104, 106, 111~114, 121, 121, 124, 125, 281, 282, 286~288, 291, 292, 295, 298, 301, 302, 304, 306, 308, 311~315, 318, 321~323, 325, 328, 381, 382, 386~388, 391, 392, 395, 401, 402, 404, 406, 408, 411~415, 421~423, 425, 428 Outer Box 89, 99, 109, 119, 129, 289, 299, 309, 319, 329, 389, 399, 409, 419, 429 Word Replacement Box
90, 290, 390 sentence of 2nd sentence pattern
100, 300, 400 sentence of 3rd sentence pattern
106A~E, 291A~I, 295A~G, 391A~I Inner Box
110, 310, 410 sentence of 4th sentence pattern
120, 320, 420 sentence of 5th sentence pattern
133 button
200 Japanese speaking user
210, 231, 232, 241, 242 box
220 English speaking user
530, 560 message screen
532, 532A date panel
534, 534A sender panel
536, 536A age panel
538, 538A birthday panel
540, 540A title panel
542, 542A message panel
544, 544A reply button
546, 546A audio visual panel
548, 548A descriptive text
550, 550A picture button
552, 552A video button
554, 554A audio button

The invention claimed is:

1. A multilingual exchange system including a message communication device which comprises a message construction screen on which a 1st language message including at least one sentence or phrase in a 1st language is displayed and on which a 2nd language message that corresponds to the 1st language message is displayed, the multilingual exchange system being configured to send at least the 2nd language message, wherein
the message construction screen displays display element columns for arranging display elements which are display areas for respective elements corresponding to each of five English sentence patterns,
the display element columns are configured such that grammatically necessary elements of the five English sentence patterns, which include subject S, predicate verb V, objective O, complement C, and modifier M, correspond to each of the display elements of the display element columns,
on each of the corresponding display elements, one or multiple words related to the 1st language message that are included in the at least one sentence or phrase of the 1st language are displayed, and one or multiple words in the 2nd language that correspond to the one or multiple words of the 1st language are displayed, and
an order of the display elements is changed so that a text displayed including at least one sentence or phrase of the 2nd language is arranged into a grammatically correct word order.

2. The multilingual exchange system according to claim 1, wherein multiple sub display elements are allocated to each of the display elements depending on the at least one sentence or phrase of the 1st language to be displayed on each of the display elements, and on each of the sub display elements, the at least one sentence or phrase of the 1st language displayed on the display elements is divided and entered based on parts of speech in the at least one sentence or phrase of the 1st language.

3. The multilingual exchange system according to claim 2, wherein conversion, deletion or addition of the sub display elements is allowed.

4. The multilingual exchange system according to claim 2, wherein deletion or addition of the display elements corresponding to the subject S, the predicate verb V, the objective O, and the complement C is prohibited, and deletion or addition of the display elements corresponding to the modifier M is allowed.

5. The multilingual exchange system according to claim 4, wherein conversion, deletion or addition of the sub display elements is allowed.

6. The multilingual exchange system according to claim 1, wherein deletion or addition of the display elements corresponding to the subject S, the predicate verb V, the objective O, and the complement C is prohibited, and deletion or addition of the display elements corresponding to the modifier M is allowed.

7. A method for transmitting a message comprising a message construction screen on which a 1st language message including at least one sentence or phrase in a 1st language is displayed and on which a 2nd language message that corresponds to the 1st language message is displayed, and at least the 2nd language message is sent,
wherein, the method includes:
displaying on the message construction screen display element columns for arranging display elements which are display areas for respective elements corresponding to each of five English sentence patterns, wherein
the display element columns are configured such that grammatically necessary elements of the five English sentence patterns, which include subject S, predicate verb V, objective O, complement C, and modifier M, correspond to each of the display elements of the display element columns;
displaying, on each of the corresponding display elements, one or multiple words related to the 1st language message included in the at least one sentence or phrase of the 1st language and one or multiple words in the 2nd language corresponding to the one or multiple words of the 1st language; and
changing an order of a text displayed including at least one sentence or phrase of the 2nd language into a grammatically correct word order.

8. The method for transmitting a message according to claim 7, wherein multiple sub display elements are allocated to each of the display elements, and on each of the sub display elements, the at least one sentence or phrase of the 1st language displayed on the display elements is divided and entered based on parts of speech in the at least one sentence or phrase of the 1st language, and the 2nd language message is sent to a user of the 2nd language, in accordance with a predetermined operation.

9. The method for transmitting a message according to claim 8, wherein at least the 2nd language message is transmitted by text data and by voice data of the user who orally speaks based on the reproduction of the at least the $2^{nd}$ language message by voice.

10. The method for transmitting a message according to claim 7, wherein at least the 2nd language message is transmitted by text data and by voice data of the user who orally speaks based on the reproduction of the at least the $2^{nd}$ language message by voice.

* * * * *